(No Model.)
F. J. BERNHARDT.
HOSE OR PIPE COUPLING.
No. 593,191. Patented Nov. 9, 1897.
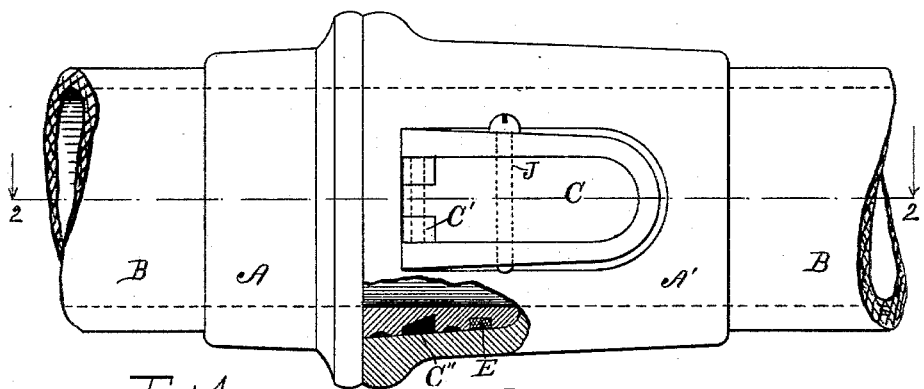
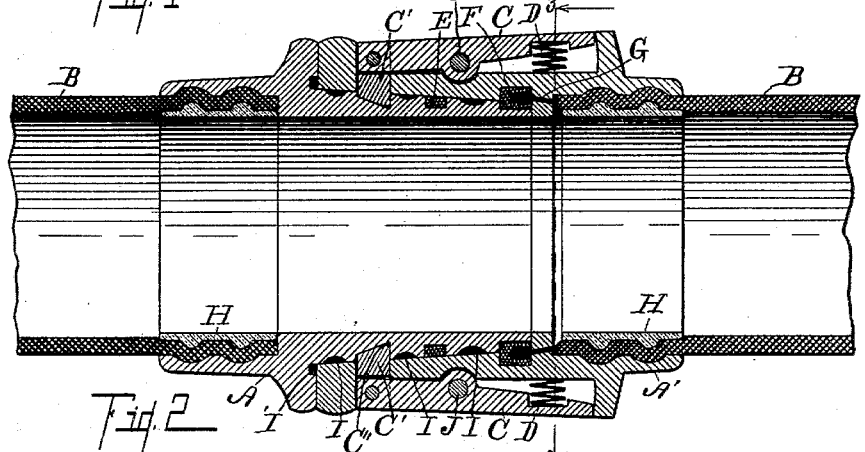
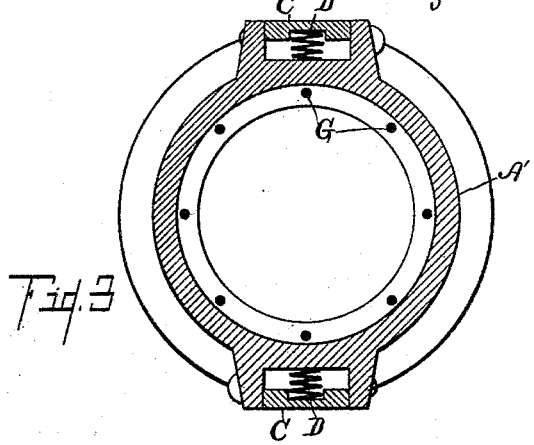
Witnesses.
W. S. Wood
Chas. A. Day
Inventor.
Frank J. Bernhardt
By Fred L. Chappell
Attorney.

UNITED STATES PATENT OFFICE.

FRANK J. BERNHARDT, OF WAUSAU, WISCONSIN.

HOSE OR PIPE COUPLING.

SPECIFICATION forming part of Letters Patent No. 593,191, dated November 9, 1897.

Application filed June 10, 1897. Serial No. 640,274. (No model.)

*To all whom it may concern:*

Be it known that I, FRANK J. BERNHARDT, a citizen of the United States, residing at the city of Wausau, in the county of Marathon and State of Wisconsin, have invented certain new and useful Improvements in Hose or Pipe Couplings, of which the following is a specification.

This invention relates to improvements in hose or pipe couplings, and is an improvement in many particulars on the structure shown in my application for a patent filed June 13, 1896, Serial No. 595,236, and possesses distinct characteristics of its own.

The objects of this invention are, first, to provide a snap hose-coupling in which the lugs or dogs which hold the members together will positively engage and lock the members together without strain upon the pivots on which they are carried; second, to provide in a coupling an improved packing; third, to provide an improved snap-coupling of great strength.

Further objects will definitely appear in the detailed description to follow.

I accomplish the objects of my invention by the devices and means described in the following specification, definitely pointed out in the claims, and illustrated in the accompanying drawings, in which—

Figure 1 is an elevation of my improved coupling in use as a hose-coupling, a portion being broken away to show details of construction. Fig. 2 is a longitudinal detail sectional view taken on line 2 2 of Fig. 1, looking in the direction of the little arrows at the ends of the section-line. Fig. 3 is a transverse detail sectional elevation taken on line 3 3 of Fig. 2, looking toward the left of the view or in the direction of the little arrows at the ends of the section-line.

In the drawings similar letters of reference refer to similar parts throughout the several views.

Referring to the lettered parts of the drawings, A is the male member of the coupling, and A' is the female member of the coupling. The male member of the coupling is slightly conical in form and is shouldered near the inner end to receive the packing F, which is U-shaped in cross-section. The limbs of the U project toward the female coupling and rest against a shoulder therein. Perforations G are made through the shoulder on the female coupling to admit whatever fluid is being conducted through the pipe to press the limbs of the U-shaped packing F tight against the opposite members of the coupling to form a tight joint in that way. Another similar packing-groove is turned in the male coupling about half-way up and contains an ordinary rubber gasket. Another annular groove C" is turned in the male coupling up toward the shoulder against which the end of the female coupling rests. This groove has a square shoulder toward its end and is engaged by the dogs on the female member of the coupling. Shallow annular depressions I I I' are turned between the packing-grooves and the groove C" to serve to receive any sand that may be on either member of the coupling and prevent its being ground upon the bearing-surface to their injury. A similar groove I' is turned into the shoulder of the male coupling at its inner edge to receive any sand or accumulations that may be wiped in that direction by the female member of the coupling in joining the same.

In suitable recesses formed on opposite sides of the female coupling are supported levers C, which are fulcrumed on the pivots J. The rear ends of these levers are thrown normally out by coiled springs D. Toward the front end of the lever are pivoted engaging dogs C', which pass through and are guarded by suitable apertures formed in the female coupling a little distance from the outer edge. This leaves stock between the lugs C' and the shoulder of the male member of the coupling that serve to support the same. These dogs C' being pivoted to the ends of the lever it is impossible for any strain to be transferred to the pivots J, on which the levers are supported, and the strain comes directly upon the dogs themselves. This is owing to the fact that they are inserted through comparatively tight-fitting apertures or mortises in the female member of the coupling.

Where my improved coupling is used as a hose-coupling, I prefer to attach the same and secure it to the hose by the means illustrated in the drawings, though I am aware that the remaining features of my improved coupling can be utilized with any means of attaching the coupling to a hose. I secure ordinary rubber hose to my coupling by inserting the end of the hose within the coupling, which is of sufficient size to admit the hose freely. The end of the member contains annular depressions within. I then insert a soft-metal band H, made of lead and copper or other ductile material and having projecting rings corresponding to the annular depressions in the coupling within the hose, and expand it within the end of the hose, so that the projections extend into the corresponding depressions in the members of the coupling. With these bands H expanded so that their inner diameter is the same as that of the hose a very smooth and perfect joint is formed with no opportunity for leakage.

Where the coupling is secured to steam-pipes or other pipes, the attaching means I have shown would be impracticable. Any practical and well-known means can be employed for attaching it under such circumstances.

Having thus described my improved coupling, I desire to state that many of its features are available in styles of coupling other than here shown. The fastening means for attaching to the hose can be utilized in connection with other couplings. The U-shaped packing shown is also capable of utilization with other styles of coupling, but is particularly adapted to a coupling of this style. By constructing a coupling with great care very little or no packing will be needed even with this style of coupling, but the great care required would make the coupling unnecessarily expensive and it would be impractical for ordinary use.

Having thus described my invention, what I claim as new, and desire to secure by Letters Patent, is—

1. In a coupling for pipes or hose, the combination of a male member A, containing packing-grooves and a shoulder at its inner end for receiving a packing, and a groove $C''$ toward its outer end for engagement with dogs on the female member and containing sand-grooves formed between the remaining grooves and at its outer end next the shoulder; a female coupling $A'$ fitted to said male coupling with a groove and internal collar at its inner end containing perforations G; a U-shaped packing F between the shoulders of the female coupling and the shoulder at the end of the male coupling with the opening side toward the female coupling so that any fluid in the pipe will enter between the limbs of the U-shaped packing; levers C pivoted to the outside thereof with dogs $C'$ pivoted toward their outer end and fitted through mortises toward the center and positioned to engage the groove $C''$ of the male coupling; and springs D under the outer ends of said levers C to hold them normally in the engaging position; all coacting together as described for the purpose specified.

2. In a coupling for pipes or hose, the combination of a male member having a shoulder at its inner end to receive a packing; the female member to fit the same having a shoulder at its inner end also to receive a packing, the said shoulder containing a suitable connecting channel as perforations G; a packing-ring U-shaped in cross-section adapted to fit between the shoulders of said members with its open side toward the female member so that fluid can be admitted through the said connecting channel or perforations to press the packing into place to form a tight joint and suitable engaging means for locking the members of the coupling together, as specified.

3. In a coupling for pipes or hose, the combination of a male member containing suitable packing-grooves, and a groove with a shoulder on its side toward the outer end for engagement by suitable dogs on the female member; a female member adapted to fit the male member of said coupling; levers pivoted to the outside of said female coupling; dogs pivoted on the ends of said levers toward the outer end of the female coupling adapted to pass through suitable mortises toward the outer end and engage the male coupling within and springs to throw said levers normally into the engaging position, coacting as specified.

4. In a coupling for pipes or hose, the combination of a male member; a female member; levers pivoted to the outside of said female member having suitable dogs thereon toward the outer end of the female member passing through suitable mortises toward the outer end of the female member to engage the male member within and retain it by the dogs engaging the sides of the mortises, as specified.

In witness whereof I have hereunto set my hand and seal in the presence of two witnesses.

FRANK J. BERNHARDT. [L. S.]

Witnesses:
M. B. ROSENBERRY,
SARAH GUMTZ.